United States Patent
Hahn et al.

(10) Patent No.: US 9,115,312 B2
(45) Date of Patent: Aug. 25, 2015

(54) FLAME RETARDANT

(75) Inventors: Klaus Hahn, Kirchheim (DE); Sabine Fuchs, Mannheim (DE); Ingo Bellin, Mannheim (DE); Patrick Spies, Neustadt (DE); Maximilian Hofmann, Island South (CN); Peter Deglmann, Mannheim (DE); Klemens Massonne, Bad Dürkheim (DE); Hartmut Denecke, Ludwigshafen (DE); Christoph Fleckenstein, Freigericht (DE); Geert Janssens, Friedelsheim (DE); Manfred Döring, Wörth (DE); Michael Ciesielski, Merseburg (DE); Jochen Wagner, Mutterstadt (DE)

(73) Assignee: BASF SE (DE)

( * ) Notice: Subject to any disclaimer, the term of this patent is extended or adjusted under 35 U.S.C. 154(b) by 237 days.

(21) Appl. No.: 13/075,518

(22) Filed: Mar. 30, 2011

(65) Prior Publication Data
US 2011/0245360 A1 Oct. 6, 2011

Related U.S. Application Data

(60) Provisional application No. 61/319,904, filed on Apr. 1, 2010.

(51) Int. Cl.
| | |
|---|---|
| C08J 9/00 | (2006.01) |
| C08K 5/36 | (2006.01) |
| C09K 21/12 | (2006.01) |
| C08K 5/49 | (2006.01) |

(52) U.S. Cl.
CPC ............... *C09K 21/12* (2013.01); *C08J 9/0033* (2013.01); *C08K 5/36* (2013.01); *C08K 5/49* (2013.01); *C08J 2325/06* (2013.01)

(58) Field of Classification Search
CPC ...... C08J 9/0033; C08J 2325/06; C08K 5/36; C08K 5/49; C09K 21/12
USPC ................ 521/56, 79, 85, 89, 90, 95, 97, 146
See application file for complete search history.

(56) References Cited

U.S. PATENT DOCUMENTS

| | | | | |
|---|---|---|---|---|
| 3,284,544 | A | * | 11/1966 | Eichhorn ................. 524/83 |
| 3,542,701 | A | | 11/1970 | van Raamsdonk |
| 5,124,450 | A | | 6/1992 | Bergfeld et al. |
| 5,239,003 | A | * | 8/1993 | Onishi et al. ................. 525/181 |
| 5,969,015 | A | * | 10/1999 | Zinke et al. ................. 524/109 |
| 6,420,442 | B1 | * | 7/2002 | Dietzen et al. ................. 521/82 |
| 6,444,714 | B1 | * | 9/2002 | Gluck et al. ................. 521/56 |
| 7,351,339 | B2 | | 4/2008 | Maase et al. |
| 7,767,852 | B2 | | 8/2010 | Volland et al. |
| 8,563,637 | B2 | * | 10/2013 | Jakupca et al. ................. 524/128 |
| 2008/0083606 | A1 | | 4/2008 | Volland et al. |
| 2012/0178842 | A1 | | 7/2012 | Hahn et al. |
| 2012/0184635 | A1 | | 7/2012 | Eberstaller et al. |
| 2012/0264837 | A1 | | 10/2012 | Eberstaller et al. |

FOREIGN PATENT DOCUMENTS

| | | |
|---|---|---|
| CN | 101544624 A | 9/2009 |
| DE | 1694945 A1 | 8/1971 |
| DE | 4032680 | 4/1992 |
| EP | 0806451 A1 | 11/1997 |
| JP | 1261361 | 10/1989 |
| JP | 2004277609 A | 10/2004 |
| JP | 2012/531504 A | 12/2012 |
| JP | 2013-506009 A | 2/2013 |
| WO | WO-96/17853 A1 | 6/1996 |
| WO | WO-03/062251 A1 | 7/2003 |
| WO | WO-2006/063287 A2 | 6/2006 |
| WO | WO-2007/058736 A1 | 5/2007 |
| WO | WO-2009/035881 A2 | 3/2009 |
| WO | WO-2011/029901 A1 | 3/2011 |

OTHER PUBLICATIONS

USPTO STIC Sttructure search, Jan. 2013.*
International Search Report for PCT/EP2011/054874 dated Aug. 29, 2011.

* cited by examiner

*Primary Examiner* — Irina S Zemel
(74) *Attorney, Agent, or Firm* — Drinker Biddle & Reath LLP

(57) ABSTRACT

A flame retardant comprising
a) at least one sulfur compound of the formula (I)

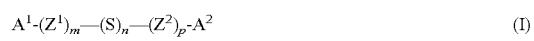

$$A^1\text{-}(Z^1)_m\text{-}(S)_n\text{-}(Z^2)_p\text{-}A^2 \quad (I)$$

where the definitions of the symbols and indices are as follows:

$A^1$ and $A^2$ are identical or different, being $C_6$-$C_{12}$-aryl, cyclohexyl, $Si(OR^a)_3$, a saturated, partially unsaturated, or aromatic, mono- or bicyclic ring having from 3 to 12 ring members and comprising one or more heteroatoms from the group of N, O, and S, where the system is unsubstituted or has substitution by one or more substituents of the group of O, OH, S, SH, $COOR^b$, $CONR^cR^d$, $C_1$-$C_{18}$-alkyl, $C_1$-$C_{18}$-alkoxy, $C_1$-$C_{18}$-thioalkyl, $C_6$-$C_{12}$-aryl, $C_6$-$C_{12}$-aryloxy, $C_2$-$C_{18}$-alkenyl, $C_2$-$C_{18}$-alkenoxy, $C_2$-$C_{18}$-alkynyl, and $C_2$-$C_{18}$-alkinoxy;

$Z^1$ and $Z^2$ are identical or different, being —CO— or —CS—;

$R^a$ is $C_1$-$C_{18}$-alkyl;

$R^b$, $R^c$, and $R^d$ are identical or different, being H, $C_1$-$C_{18}$-alkyl, $C_6$-$C_{12}$-aryl, or an aromatic, mono- or bicyclic ring having from 3 to 12 ring members and comprising one or more heteroatoms from the group of N, O, and S;

m and p are identical or different, being 0 or 1, and
n is a natural number from 2 to 10, and b) at least one halogen-free organophosphorus compound having phosphorus content in the range from 5 to 80% by weight, based on the phosphorus compound, is particularly suitable for protecting foams based on styrene polymers.

16 Claims, No Drawings

FLAME RETARDANT

CROSS-REFERENCE TO RELATED APPLICATIONS

This application claims the benefit under 35 USC 119(e) of U.S. Provisional Application 61/319,904, filed Apr. 1, 2010 which is incorporated by reference.

BACKGROUND OF THE INVENTION

The invention relates to a flame retardant comprising a phosphorus compound and comprising a sulfur compound, and to a polymer composition, in particular in the form of foam, comprising the flame retardant, to processes for producing the polymer composition, and to the use of the foamed polymer composition as insulation material.

The provision of flame retardants to polymers, in particular to foams, is important for a wide variety of applications, examples being molded polystyrene foams made of expandable polystyrene (EPS), or extruded polystyrene foam sheets (XPS), for insulating buildings.

The flame retardants currently used in plastics are mainly polyhalogenated hydrocarbons, optionally in combination with suitable synergists, for example organic peroxides or nitrogen-containing compounds. A typical representative of these traditional flame retardants is hexabromocyclododecane (HBCD) which is used by way of example in polystyrene. The plastics industry is making major efforts to replace halogenated flame retardants for reasons of bioaccumulation, and also because of the persistence properties of some polyhalogenated hydrocarbons.

DE-A 16 94 945 has proposed combinations of sulfur with bromine compounds and with phosphorus compounds as flame retardants for polystyrene foams.

EP-A 0 806 451 discloses, alongside elemental sulfur, dialkyl polysulfides as synergists for organophosphorus flame retardants for use in expanded (EPS and XPS) polystyrene foams.

WO 2009/035881 describes phosphorus-sulfur compounds which optionally have di- or polysulfide groups.

Although the known systems are already achieving good results, there is much scope for improvements, particularly in relation to production, performance characteristics, and interactions between associated additions in the materials requiring protection. By way of example, increased amounts of the conventional flame retardant HBCD have to be used when athermanous substances such as chalk or graphite are also present.

BRIEF SUMMARY OF THE INVENTION

It is therefore an object to provide further flame retardants which, at least in some sectors, provide improvements or mitigate the disadvantages of the known systems.

It has been found that flame retardants which bear, alongside an organophosphorus compound, a di- or polysulfide having aromatic or heterocyclic terminal groups have excellent properties particularly when used in polymer foams.

The invention therefore provides a flame retardant comprising
a) at least one sulfur compound of the formula (I)

$$A^1\text{-}(Z^1)_m\text{---}(S)_n\text{---}(Z^2)_p\text{-}A^2 \quad (I)$$

where the definitions of the symbols and indices are as follows:

$A^1$ and $A^2$ are identical or different, being $C_6$-$C_{12}$-aryl, cyclohexyl, $Si(OR^a)_3$, a saturated, partially unsaturated, or aromatic, mono- or bicyclic ring having from 3 to 12 ring members and comprising one or more heteroatoms from the group of N, O, and S, where the system is unsubstituted or has substitution by one or more substituents of the group of O, OH, S, SH, $COOR^b$, $CONR^cR^d$, alkyl, $C_1$-$C_{18}$-alkoxy, $C_1$-$C_{18}$-thioalkyl, $C_6$-$C_{12}$-aryl, $C_6$-$C_{12}$-aryloxy, $C_2$-$C_{18}$-alkenyl, $C_2$-$C_{18}$-alkenoxy, $C_2$-$C_{18}$-alkynyl, and $C_2$-$C_{18}$-alkinoxy;

$Z^1$ and $Z^2$ are identical or different, being —CO— or —CS—;

$R^a$ is $C_1$-$C_{18}$-alkyl;

$R^b$, $R^c$, and $R^d$ are identical or different, being H, $C_6$-$C_{12}$-aryl, or an aromatic, mono- or bicyclic ring having from 3 to 12 ring members and comprising one or more heteroatoms from the group of N, O, and S;

m and p are identical or different, being 0 or 1, and
n is a natural number from 2 to 10, and b) at least one halogen-free organophosphorus compound having phosphorus content in the range from 5 to 80% by weight, based on the phosphorus compound,
in an a:b ratio by weight of from 1:10 to 10:1.

The invention further provides the use of a mixture of components a) and b) as flame retardant.

The invention further provides a polymer composition, preferably a polymer foam, particularly preferably a styrene-polymer-based polymer foam, comprising from 0.1 to 15 parts by weight, based on 100 parts by weight of the polymer, of the flame retardant of the invention.

The invention equally provides a process for producing the polymer composition of the invention, where a melt of the polymer is produced and mixed with the flame retardant of the invention.

The invention also provides the use of the polymer composition of the invention as insulation material, particularly in the construction industry.

DETAILED DESCRIPTION OF THE INVENTION

The flame retardant of the invention features by way of example improved processability during the production of foams based on styrene polymers. It is particularly suitable for protecting low-density foams.

It is advantageous that addition of athermanous compounds does not generally affect the flame-retardant action.

The flame retardant of the invention comprises one or more, preferably from 1 to 3, particularly preferably 1, compound(s) of the formula (I).

The definitions of the symbols and indices in the formula (I) are preferably as follows.

$A^1$ and $A^2$, being identical or different, are preferably phenyl, biphenyl, naphthyl, a 5- to 8-membered saturated ring having one or two heteroatoms from the group of N, S, and O, or a 5- to 10-membered, mono- or bicyclic aromatic ring having from 1 to 4 heteroatoms from the group of N, S, and O, where the five ring systems mentioned, being identical or different, are unsubstituted or have substitution by one or more substituents from the group of O, OH, $C_1$-$C_{12}$-alkoxy, $C_2$-$C_{12}$-alkenyloxy, and $COOR^b$.

$Z^1$ and $Z^2$, being identical or different, are preferably —CO— or —CS—.

$R^b$ is preferably H, $C_1$-$C_{12}$-alkyl, $C_6$-$C_{10}$-aryl, or an aromatic 5- or 6-membered ring comprising one or more heteroatoms from the group of N, O, and S.

m and p are preferably 0 or 1.

n is preferably a natural number from 2 to 10.

Preference is given to compounds of the formula (I) in which the definitions of symbols and indices are the preferred definitions.

The definitions of the symbols in the formula (I) are particularly preferably as follows:

$A^1$ and $A^2$, being identical or different, are particularly preferably

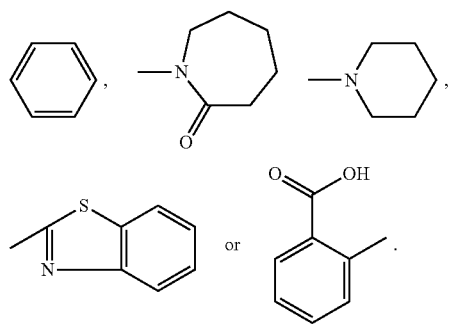

$Z^1$ and $Z^2$ are particularly preferably —CS—.

m and p are particularly preferably 0 or 1.

n is particularly preferably 2, 4, or 6.

Particular preference is given to compounds of the formula (I) in which the definitions of all of the symbols and indices are the particularly preferred definitions.

Very particular preference is given to the following compounds of the formula (I)

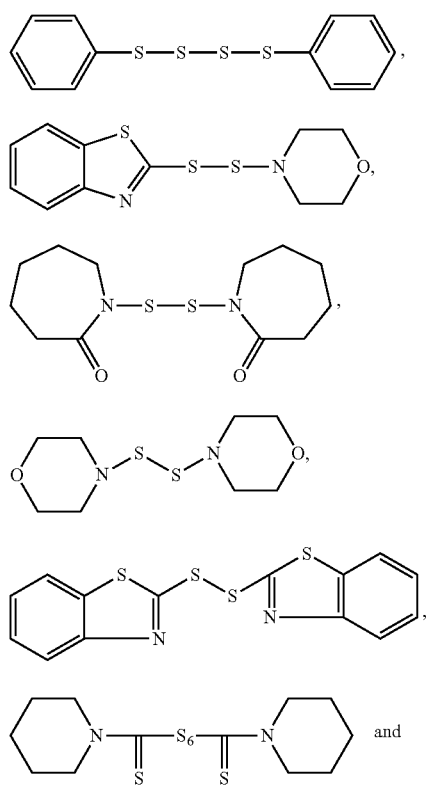

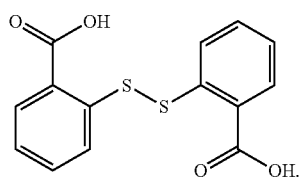

The compounds of the formula (I) are known and are either available commercially or can be produced by customary methods which are known to the person skilled in the art, for example those described for N-polysulfides (e.g. I-3 and I-4) in Houben-Weyl, "Methoden der organischen Chemie" [Methods of organic chemistry], volume 11/2, 1958, pp. 747 and 749, and for organodisulfides and diorganodisulfides (e.g. I-1, I-2, I-5) in Houben-Weyl, "Methoden der organischen Chemie" [Methods of organic chemistry], volume E11, 1985, pp. 129-149, and for higher diorganopolysulfides (e.g. I-6) in Houben-Weyl, "Methoden der organischen Chemie" [Methods of organic chemistry], volume E11, 1985, pp. 157.

The detailed syntheses of the abovementioned compounds are described in:

Compound I-1:

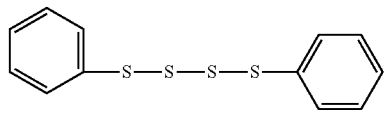

Zysman-Colman, Eli; Harpp, David N.; Journal of Organic Chemistry (2003), 68(6), 2487-2489.

Compound I-2:

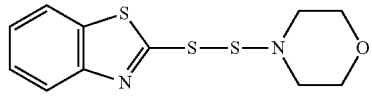

Bergfeld, Manfred; Eisenhuth, Ludwig. (Akzo Patente Gmbh, Germany). Ger. Offen. (1992), DE 4032680 A1 19920416.

Compound I-3:

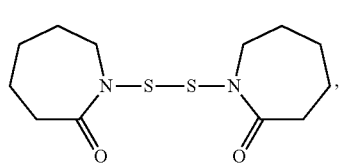

Commercially available e.g. from RASCHIG GmbH, Ludwigshafen, Germany.

Compound I-4:

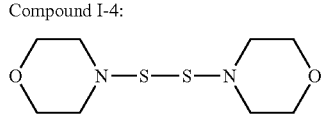

Sun, Ranfeng; Zhang, Yonglin; Chen, Li; Li, Yongqiang; Li, Qingshan; Song, Haibin; Huang, Runqiu; Bi, Fuchun; Wang, Qingmin. Journal of Agricultural and Food Chemistry (2009), 57(9), 3661-3668.

Compound I-5:

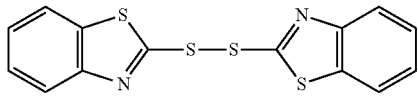

Naimi-Jamal, M. Reza; Hamzeali, Hamideh; Mokhtari, Javad; Boy, Jurgen; Kaupp, Gerd.; ChemSusChem (2009), 2(1), 83-88, and also in Ozen, Recep; Aydin, Fatma; Monatshefte für Chemie (2006), 137(3), 307-310.

Compound I-6:

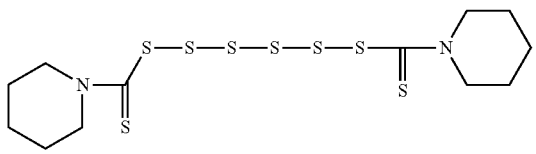

Yoshigaki, Satoru; Anzai, Kunitomo; Kawasaki, Tsuneo. (Ouchi Shinko Chemical Industrial Co., Ltd., Japan). Jpn. Kokai Tokkyo Koho (1989) JP 01261361 A 19891018, and also in Levi, T. G. Gazzetta Chimica Italiana (1931), 61 373-82.

Compound I-7:

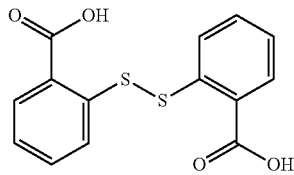

Commercially available e.g. from Sigma-Aldrich Chemie GmbH, Steinheim, Germany.

The ratio by weight of sulfur compound(s) a) to phosphorus compound(s) b) is from 1:10 to 10:1, preferably from 1:6 to 6:1, particularly preferably from 1:3 to 3:1.

The flame retardant of the invention comprises, as component b), one or more, preferably from 1 to 3, particularly preferably 1 or 2, in particular 1, phosphorus compound(s) having phosphorus content in the range from 5 to 80% by weight, based on phosphorus compound.

Preference is given to phosphorus compounds of the formula (II)

where the definitions of the symbols and the indices in the formula (II) are as follows:

$R^1$ is $C_1$-$C_{16}$-alkyl, $C_1$-$C_{10}$-hydroxyalkyl, $C_2$-$C_{16}$-alkenyl, $C_1$-$C_{16}$-alkoxy, $C_2$-$C_{16}$-alkenoxy, $C_3$-$C_{10}$-cycloalkyl, $C_3$-$C_{10}$-cycloalkoxy, $C_6$-$C_{10}$-aryl, $C_6$-$C_{10}$-aryloxy, $C_6$-$C_{10}$-aryl-$C_1$-$C_{16}$-alkyl, $C_6$-$C_{10}$-aryl-$C_1$-$C_{16}$-alkoxy, $SR^9$, $COR^{10}$, $COOR^{11}$, $CONR^{12}R^{13}$;

$R^2$ is $C_1$-$C_{16}$-alkyl, $C_1$-$C_{10}$-hydroxyalkyl, $C_2$-$C_{16}$-alkenyl, $C_1$-$C_{16}$-alkoxy, $C_2$-$C_{16}$-alkenoxy, $C_3$-$C_{10}$-cycloalkyl, $C_3$-$C_{10}$-cycloalkoxy, $C_6$-$C_{10}$-aryl, $C_6$-$C_{10}$-aryl-$C_1$-$C_{16}$-alkyl, $C_6$-$C_{10}$-aryl-$C_1$-$C_{16}$-alkoxy, $SR^9$, $COR^{10}$, $COOR^{11}$, $CONR^{12}R^{13}$;

$R^3$ is H, SH, $SR^4$, OH, $OR^5$, or a

—$(Y^1)_n$—[P(=$X^2$)$_u$$R^6$—$(Y^2)_n$]$_m$—P(=$X^3$)$_t$$R^7R^8$ group;

or two groups $R^1$, $R^2$, $R^3$ form, together with the phosphorus atom bonded thereto, a ring system;

$X^1$, $X^2$ and $X^3$ are identical or different, being, independently of one another, O or S;

$Y^1$ and $Y^2$ are identical or different, being O or S;

$R^4$, $R^5$, $R^9$, $R^{10}$, $R^{11}$, $R^{12}$, and $R^{13}$ are identical or different, being $C_1$-$C_{12}$-alkyl, $C_3$-$C_8$-cycloalkyl, which may either have no substitution or may have one or more $C_1$-$C_4$-alkyl groups as substituents, or being $C_2$-$C_{12}$-alkenyl, $C_2$-$C_{12}$-alkynyl, $C_6$-$C_{10}$-aryl, or $C_8$-$C_{10}$-aryl-$C_1$-$C_4$-alkyl;

$R^6$, $R^7$, and $R^8$ are identical or different, being, independently of one another, $C_1$-$C_{16}$-alkyl, $C_2$-$C_{16}$-alkenyl, $C_1$-$C_{18}$-alkoxy, $C_2$-$C_{18}$-alkenoxy, $C_3$-$C_{10}$-cycloalkyl, $C_3$-$C_{10}$-cycloalkoxy, $C_6$-$C_{10}$-aryl, $C_6$-$C_{10}$-aryloxy, $C_8$-$C_{10}$-aryl-$C_1$-$C_{16}$-alkyl, $C_8$-$C_{10}$-aryl-$C_1$-$C_{16}$-alkoxy, $SR^9$, $COR^{10}$, $COOR^{11}$, $CONR^{12}R^{13}$;

n is 0 or 1 if $Y^1$ and, respectively, $Y^2$ is O, and is 1, 2, 3, 4, 5, 6, 7, or 8 if $Y^1$ and, respectively, $Y^2$ is S, and m is an integer from 0 to 100;

s, t, and u are, independently of one another, 0 or 1.

It is preferable that the definitions of the symbols and indices of the formula (II) are as follows:

$R^1$ is preferably $C_1$-$C_{18}$-alkyl, $C_1$-$C_{10}$-hydroxyalkyl, $C_2$-$C_{16}$-alkenyl, $C_1$-$C_{16}$-alkoxy, $C_2$-$C_{16}$-alkenoxy, $C_3$-$C_{10}$-cycloalkyl, $C_3$-$C_{10}$-cycloalkoxy, $C_6$-$C_{10}$-aryl, $C_6$-$C_{10}$-aryloxy, $C_8$-$C_{10}$-aryl-$C_1$-$C_{16}$-alkyl, $C_8$-$C_{10}$-aryl-$C_1$-$C_{16}$-alkoxy.

$R^2$ is preferably $C_1$-$C_{16}$-alkyl, $C_1$-$C_{10}$-hydroxyalkyl, $C_2$-$C_{16}$-alkenyl, $C_1$-$C_{16}$-alkoxy, $C_2$-$C_{16}$-alkenoxy, $C_3$-$C_{10}$-cycloalkyl, $C_3$-$C_{10}$-cycloalkoxy, $C_6$-$C_{10}$-aryl, $C_8$-$C_{10}$-aryl-$C_1$-$C_{18}$-alkyl, $C_8$-$C_{10}$-aryl-$C_1$-$C_{16}$-alkoxy.

$R^3$ is preferably H, SH, $SR^4$, OH, $OR^5$, or a

—$(Y^1)_n$—[P(=$X^2$)$_u$$R^6$—$(Y^2)_n$]$_m$—P(=$X^3$)$_t$$R^7R^8$ group.

$X^1$, $X^2$ and $X^3$ are preferably identical or different, being, independently of one another, O or S.

$Y^1$ and $Y^2$ are preferably identical or different, being O or S.

$R^4$ and $R^5$ are preferably identical or different, being $C_1$-$C_{12}$-alkyl, $C_3$-$C_8$-cycloalkyl, which may either have no substitution or may have one or more $C_1$-$C_4$-alkyl groups as substituents, or being $C_2$-$C_{12}$-alkenyl, $C_2$-$C_{12}$-alkynyl, $C_6$-$C_{10}$-aryl, or $C_6$-$C_{10}$-aryl-$C_1$-$C_4$-alkyl.

$R^6$, $R^7$, and $R^8$ are preferably identical or different, being, independently of one another, $C_1$-$C_{16}$-alkyl, $C_2$-$C_{16}$-alkenyl, $C_1$-$C_{16}$-alkoxy, $C_2$-$C_{16}$-alkenoxy, $C_3$-$C_{10}$-cycloalkyl, $C_3$-$C_{10}$-cycloalkoxy, $C_6$-$C_{10}$-aryl, $C_6$-$C_{10}$-aryloxy, $C_6$-$C_{10}$-aryl-$C_1$-$C_{16}$-alkyl, $C_6$-$C_{10}$-aryl-$C_1$-$C_{16}$-alkoxy, $SR^9$, $COR^{10}$, $COOR^{11}$, $CONR^{12}R^{13}$.

n is preferably 1 if $Y^1$ and, respectively, $Y^2$ is O, being 1 or 2 if $Y^2$ is S, and m is preferably an integer from 0 to 10.

s, t, and u are preferably 1.

Preference is given to compounds of the formula (II) in which the definitions of all of the symbols and indices are the preferred definitions.

Preference is also given to compounds of the formula (II) in which two radicals $R^1$, $R^2$, or $R^3$ do not together form a ring system.

It is particularly preferable that the definitions of the symbols and indices in the formula (II) are the following:

$R^1$ is particularly preferably $C_1$-$C_6$-alkyl, $C_1$-$C_8$-alkoxy, cyclohexyl, phenyl, phenoxy, benzyl, benzyloxy.
$R^2$ is particularly preferably $C_1$-$C_8$-alkyl, $C_1$-$C_8$-alkoxy, cyclohexyl, phenyl, benzyl, benzyloxy.
$R^3$ is particularly preferably H, SH, $SR^4$, OH, $OR^5$) or a —$(Y^1)_n$—$P(=X^3)_t R^7 R^8$ group.
$X^1$ and $X^3$ are particularly preferably identical or different, being O or S.
$Y^1$ is particularly preferably O or S.
$R^4$ and $R^5$ are particularly preferably identical or different, being $C_1$-$C_8$-alkyl, cyclohexyl, phenyl, or benzyl.
$R^7$ and $R^8$ are particularly preferably identical or different, being $C_1$-$C_8$-alkyl, $C_1$-$C_8$-alkoxy, cyclohexyl, phenyl, phenoxy, benzyl, or benzyloxy.
n is particularly preferably 1 if $Y^1$ is O, being 1 or 2 if $Y^1$ is S.
s and t are particularly preferably 1.

Particular preference is given to compounds of the formula (II) in which the definitions of the symbols and indices are the particularly preferred definitions.

It is with particular preference that the definitions of the symbols and indices in the formula (II) are as follows:
$R^1$ is with particular preference phenyl, phenoxy.
$R^2$ is with particular preference phenyl.
$R^3$ is with particular preference H, SH, $SR^4$, OH, $OR^5$, or a —$(Y^1)_n$—$P(=X^3)_t R^7 R^8$ group.
$X^1$ and $X^3$ are with particular preference identical or different, being O or S.
$Y^1$ is with particular preference O or S.
$R^4$ and $R^5$ are with particular preference identical or different, being cyclohexyl, phenyl, or benzyl.
$R^7$ and $R^8$ are with particular preference identical or different, being phenyl, phenoxy.
n is with particular preference 1 if $Y^1$ is O, being 1 or 2 if $Y^1$ is S.
s and t are with particular preference 1.

Preference is in particular given to compounds of the formula (II) in which the definitions of the symbols and indices are the definitions that are in particular preferred.

Preference is further given to the following groups of compounds of the formula (II):

| | |
|---|---|
| $S=PR^1R^2$—H | (IIa) |
| $S=PR^1R^2$—SH | (IIb) |
| $S=PR^1R^2$—OH | (IIc) |
| $S=PR^1R^2$—S-phenyl | (IId) |
| $S=PR^1R^2$—O-phenyl | (IIe) |
| $S=PR^1R^2$—S-benzyl | (IIf) |
| $S=PR^1R^2$—O-benzyl | (IIg) |
| $S=PR^1R^2$—P(=S)$R^7R^8$ | (IIh) |
| $S=PR^1R^2$—S—P(=S)$R^7R^8$ | (IIi) |
| $S=PR^1R^2$—S—S—P(=S)$R^7R^8$ | (IIj) |
| $S=PR^1R^2$—O—P(=S)$R^7R^8$ | (IIk) |
| $O=PR^1R^2$—H | (IIl) |
| $O=PR^1R^2$—SH | (IIm) |
| $O=PR^1R^2$—OH | (IIn) |
| $O=PR^1R^2$—S-phenyl | (IIo) |
| $O=PR^1R^2$—O-phenyl | (IIp) |
| $O=PR^1R^2$—S-benzyl | (IIq) |
| $O=PR^1R^2$—P(=S)$R^7R^8$ | (IIr) |
| $O=PR^1R^2$—S—P(=S)$R^7R^8$ | (IIs) |
| $O=PR^1R^2$—S—S—P(=S)$R^7R^8$ | (IIt) |
| $O=PR^1R^2$—O—P(=S)$R^7R^8$ | (IIu) |
| $O=PR^1R^2$—P(=O)$R^7R^8$ | (IIv) |
| $O=PR^1R^2$—S—P(=O)$R^7R^8$ | (IIw) |
| $O=PR^1R^2$—S—S—P(=O)$R^7R^8$ | (IIx) |
| $O=PR^1R^2$—O—P(=O)$R^7R^8$ | (IIy) | where the definitions of the symbols are as stated in the formula (I).

Preference is in particular given to the following components b)

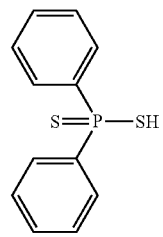

Diphenyldithiophosphinic acid

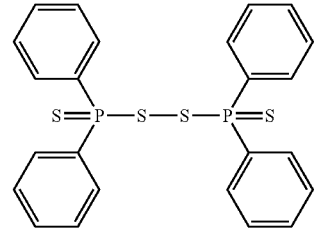

Bis(kphenylphosphinethioyl) disulfide

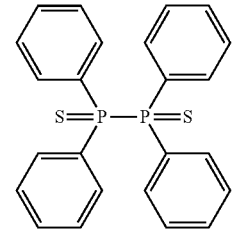    $O=P(O-Ph)_3$

Triphenyl phosphate 1,1,2,2-Tetraphenyldiphosphine disulfide

Preference is further given to phosphorus compounds of the formula (III)

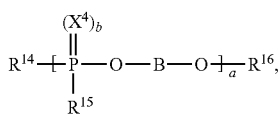

(III)

where the definitions of the symbols and indices in the formula (III) are as follows:

B is a

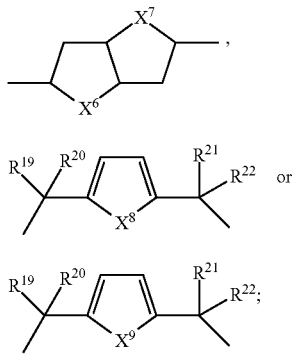

group;

$R^{16}$ is —P(=$X^5$)$_c R^{17} R^{18}$, H, a straight-chain or branched $C_1$-$C_{12}$-alkyl group, $C_5$-$C_6$-cycloalkyl, $C_6$-$C_{12}$-aryl, or benzyl, where the four last-mentioned groups are unsubstituted or have substitution by one or more radicals from the group of $C_1$-$C_4$-alkyl and $C_1$-$C_4$-alkenyl;

$R^{14}$, $R^{15}$, $R^{17}$, and $R^{18}$ are identical or different, being hydrogen, OH, $C_1$-$C_{16}$-alkyl, $C_2$-$C_{16}$-alkenyl, $C_1$-$C_{16}$-alkoxy, $C_2$-$C_{16}$-alkenoxy, $C_3$-$C_{10}$-cycloalkyl, $C_3$-$C_{10}$-cycloalkoxy, $C_6$-$C_{10}$-aryl, $C_6$-$C_{10}$-aryloxy, $C_6$-$C_{10}$-aryl-$C_1$-$C_{16}$-alkyl, $C_6$-$C_{10}$-aryl-$C_1$-$C_{16}$-alkoxy, $SR^{23}$, $COR^{24}$, $COOR^{25}$, $CONR^{26}R^{27}$, or two radicals $R^{14}$, $R^{15}$, $R^{17}$, or $R^{18}$ form, together with the phosphorus atom bonded thereto, or with a P—O—B—O—P group, a ring system;

$R^{19}$, $R^{20}$, $R^{21}$, and $R^{22}$ are identical or different, being H, $C_1$-$C_{16}$-alkyl, $C_2$-$C_{16}$-alkenyl, $C_{10}$-$C_{16}$-alkoxy, $C_2$-$C_{16}$-alkenoxy;

$R^{23}$, $R^{24}$, $R^{25}$, $R^{26}$, and $R^{27}$ are identical or different, being H, $C_1$-$C_{16}$-alkyl, $C_2$-$C_{16}$-alkenyl, $C_6$-$C_{10}$-aryl, $C_6$-$C_{10}$-aryl-$C_1$-$C_{16}$-alkyl, $C_6$-$C_{10}$-aryl-$C_1$-$C_{16}$-alkoxy;

$X^4$ and $X^5$ are identical or different, being S or O;

b and c are identical or different, preferably identical, being 0 or 1;

$X^6$, $X^7$, $X^8$, and $X^9$ are identical or different, being S or O, and a is a natural number from 1 to 50.

It is preferable that the definitions of the symbols in the formula (III) are as follows:

B is preferably a group of the formula (IV), (V), or (VI).

$R^{16}$ is preferably ($X^5$)$_c PR^{17} R^{18}$ or H.

$R^{14}$, $R^{15}$, $R^{17}$, and $R^{18}$, being identical or different, are preferably $C_6$-$C_{10}$-aryl, $C_6$-$C_{10}$-aryloxy, $C_6$-$C_{10}$-aryl-$C_1$-$C_{16}$-alkyl, or $C_6$-$C_{10}$-aryl-$C_1$-$C_{16}$-alkoxy.

$R^{15}$, $R^{20}$, $R^{21}$, and $R^{22}$ are preferably H, $C_1$-$C_{16}$-alkyl, $C_2$-$C_{16}$-alkenyl, $C_1$-$C_{16}$-alkoxy, $C_2$-$C_{16}$-alkenoxy.

$X^4$ and $X^5$, being identical or different, are preferably S or O.

b and c are preferably 0 or 1.

$X^6$, $X^7$, $X^8$, and $X^9$ are preferably O.

a is preferably a natural number from 1 to 30.

Preference is given to compounds of the formula (III) in which the definitions of all of the symbols are the preferred definitions.

It is particularly preferable that the definitions of the symbols in the formula (III) are as follows:

B is particularly preferably a group of the formula (IV), (V), or (VI).

$R^{16}$ is particularly preferably ($X^5$)$_c PR^{17} R^{18}$.

$R^{14}$, $R^{15}$, $R^{17}$, and $R^{18}$, being identical or different, are particularly preferably phenyl, phenoxy, phenyl-$C_1$-$C_{16}$-alkyl, or phenyl-$C_1$-$C_{16}$-alkoxy.

$R^{19}$, $R^{20}$, $R^{21}$, and $R^{22}$ are particularly preferably H.

$X^4$ and $X^5$, being identical or different, are particularly preferably S or O.

b and c are particularly preferably O or S.

$X^6$, $X^7$, $X^8$, and $X^9$ are particularly preferably O.

a is particularly preferably 1.

Particular preference is given to compounds of the formula (III) in which the definitions of all of the symbols and indices are the particularly preferred definitions.

Preference is given to compounds of the formula (III) in which $R^{14}$ and $R^{15}$ are identical.

Preference is further given to compounds of the formula (III) in which $R^{14}$ and $R^{17}$, or $R^{14}$ and $R^{18}$, are identical. Particular preference is further given to compounds of the formula (III) in which $R^{15}$ and $R^{17}$, or $R^{15}$ and $R^{18}$, are identical.

Further preference is given to compounds in which $R^{14}$, $R^{15}$, $R^{17}$, and $R^{18}$ are identical.

The definitions of the symbols and indices in the formula (III) are with particular preference as follows:

B is with particular preference a group of the formula (IV), (V), or (VI).

$R^{16}$ is with particular preference ($X^5$)$_c PR^{17} R^{18}$.

$R^{14}$, $R^{15}$, $R^{17}$, and $R^{18}$ are with particular preference phenyl or phenoxy.

$R^{19}$, $R^{20}$, $R^{21}$, and $R^{22}$ are with particular preference H.

$X^4$ and $X^5$ are with particular preference S or O.

b and c are with particular preference 0 or 1.

$X^8$, $X^7$, $X^8$, and $X^9$ are with particular preference oxygen.

a is with particular preference 1.

Compounds of the formula (III) which are in particular preferred are those in which the definitions of, all of the symbols and indices are the definitions that are in particular preferred.

Preference is given to compounds of the formula (III) in which respectively two of the radicals $R^{14}$, $R^{15}$, $R^{17}$, and $R^{18}$, together with the phosphorus atom bonded thereto, or with the P—O—B—O—P group, form a three- to twelve-membered ring system.

Preference is further given to compounds of the formula (III) in which two radicals $R^{14}$, $R^{15}$, $R^{17}$, and $R^{18}$ do not together form a ring system.

Compounds to which particular preference is further given are the following:

III.1
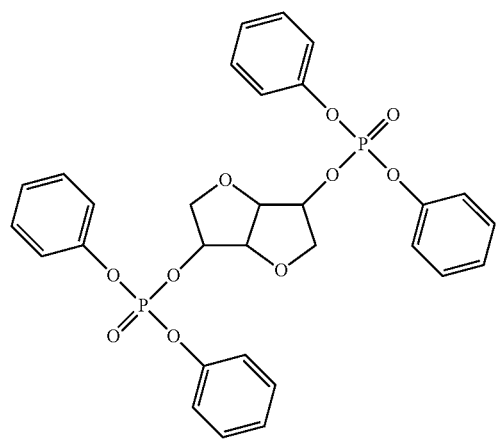
III.2
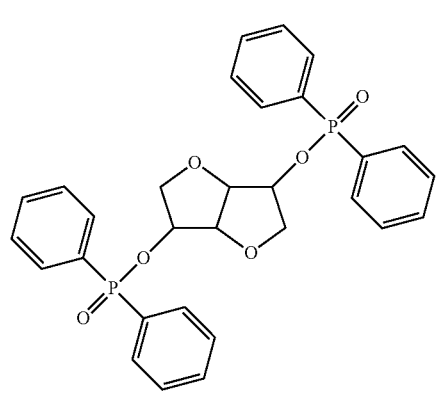
III.3
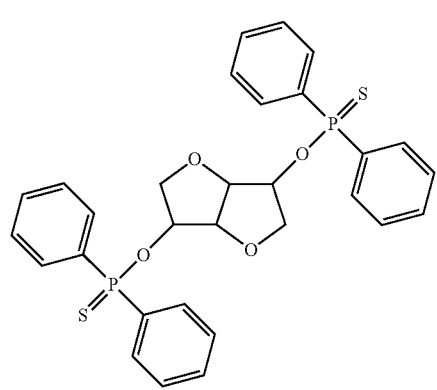
III.4
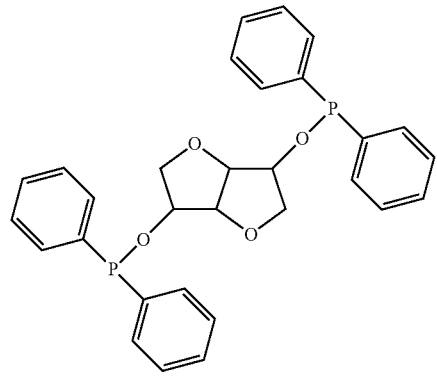
III.5
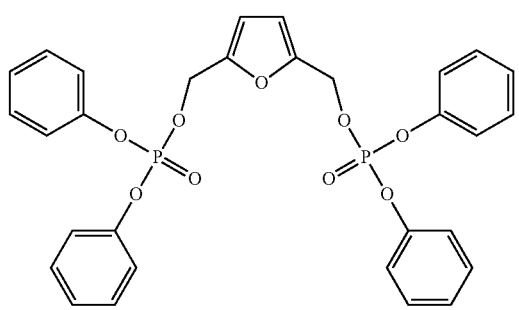
III.6
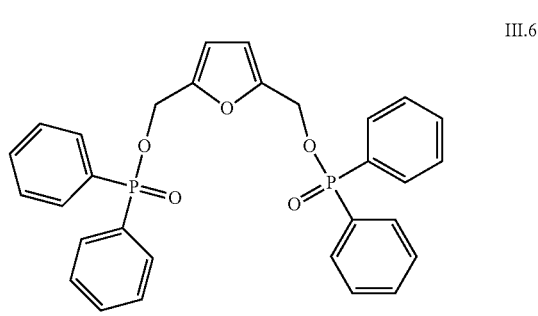
III.7
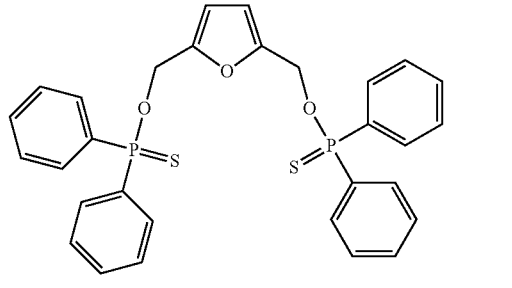
III.8
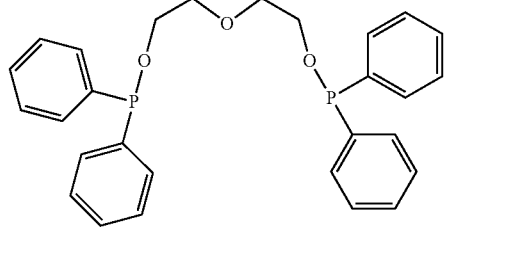
III.9
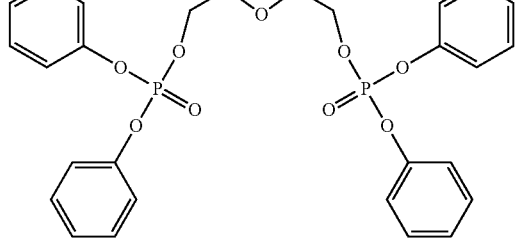

-continued

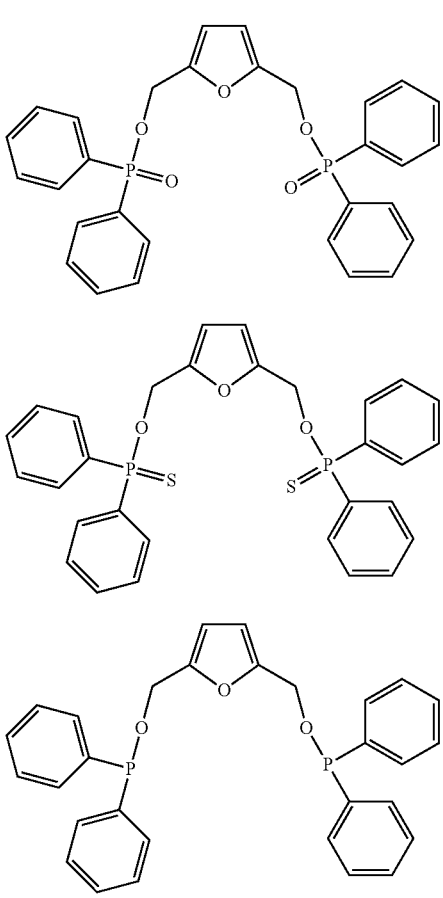

III.10

III.11

III.12

Some of the compounds of the formula (III) are known from the literature. They are synthesized by way of example by reacting the corresponding furan- or thiophene-based parent diol structures with chlorophosphorus compounds in the presence of a base. The type of reaction that underlies this process is the reaction of chlorophosphorus compounds with alcohols, which is widely described in the literature [see, for example, WO-A 2003/062251; Dhawan, Balram; Redmore, Derek. *J. Org. Chem.* (1986), 51(2), 179-83; WO 96/17853; Kumar, K. Ananda; Kasthuraiah, M.; Reddy, C. Suresh; Nagaraju, C, *Heterocyclic Communications* (2003), 9(3), 313-318; Givelet, Cecile; Tinant, Bernard; Van Meervelt, Luc; Buffeteau, Thierry; Marchand-Geneste, Nathalie; Bibal, Brigitte. *J. Org. Chem.* (2009), 74(2), 652-659.]

The furan- or thiophene-based parent diol structures are mostly commercially available or can easily be prepared by methods known from the literature, starting from sugars [see, for example: WO 2006/063287 (preparation of 2,5-bis(hydroxymethyl)-tetrahydrofuran); Cottier, Louis; Descotes, Gerard; Soro, Yaya. *Synth. Comm.* (2003), 33(24), 4285-4295, (preparation of 2,5-bis(hydroxymethyl)furan);

CA 2196632, Katritzky, Alan R.; Zhang, Zhongxing; Lang, Hengyuan; Jubran, Nusrallah; Leichter, Louis M.; Sweeny, Norman. *J. Heterocycl. Chem.* (1997), 34(2), 561-565].

The preparation of 2,5-substituted furan-based derivatives is also well known from the literature ($R^5$-$R^8$ being entirely or to some extent identical or different and not equal to H):

e.g. the preparation of α2,α5-arylated 2,5-bis(hydroxymethyl)furans: Ishii, Akihiko; Horikawa, Yasuaki; Takaki, Ikuo; Shibata, Jun; Nakayama, Juzo; Hoshino, Masamatsu. *Tetrahedron Lett.* (1991), 32(34), 4313-16; Jang, Yong-Sung; Kim, Han-Je; Lee, Phil-Ho; Lee, Chang-Hee. *Tetrahedron Lett.* (2000), 41(16), 2919-2923, or e.g. the preparation of α2,α5-alkylated 2,5-bis(hydroxymethyl)furans: Krauss, Juergen; Unterreitmeier, Doris; Antlsperger, Dorothee. *Archiv der Pharmazie* (2003), 336(8), 381-384.

e.g. the preparation of α2,α5-alkylated 2,5-bis(hydroxymethyl)tetrahydrofurans: Walba, D. M.; Wand, M. D.; Wilkes, M. C. *J. Am. Chem. Soc.* (1979), 101(15), 4396-4397.

e.g. the preparation of α2,α5-alkenylated 2,5-bis(hydroxymethyl)tetrahydrofurans: Morimoto, Yoshiki; Kinoshita, Takamasa; Iwai, Toshiyuki. *Chirality* (2002), 14(7), 578-586.

The synthesis of asymmetrically 2,5-substituted furan-based diols of this type is also known from the literature, e.g. the preparation of α2-alkylated 2,5-bis(hydroxymethyl)tetrahydrofurans: Donohoe, Timothy J.; Williams, Oliver; Churchill, Gwydian H. *Angew. Chem. Int. Ed.* (2008), 47(15), 2869-2871; or the synthesis of α2-alkylated, α5-alkynylated 2,5-bis(hydroxymethyl)tetrahydrofurans: Abe, Masato; Kubo, Akina; Yamamoto, Shuhei; Hatoh, Yoshinori; Murai, Masatoshi; Hattori, Yasunao; Makabe, Hidefumi; Nishioka, Takaaki; Miyoshi, Hideto. *Biochemistry* (2008), 47(23), 6260-6266;

or the preparation of α2-alkoxylated 2,5-bis(hydroxymethyl)furans: Lu, Dan; Li, Pingya; Liu, Jinping; Li, Haijun, CN 101544624 A.

The synthesis of the thioanalogs (X=S) of (II) is also known from the literature [cf. Kuszmann, J.; Sohar, P. *Carbohydrate Research* (1972), 21(1), 19-27].

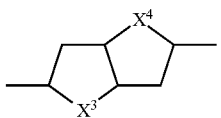

(II)

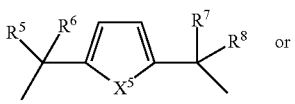

(III)

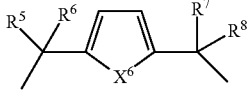

(IV)

Likewise known are the synthesis of the thioanalogs (X=S) of (III) [cf. Garrigues, Bernard. *Phosphorus, Sulfur and Silicon* (1990), 53(1-4), 75-9] and of substituted thioanalogs of III, e.g. α2,α5-arylated 2,5-bis(hydroxymethyl) thiophenes [cf. Kumaresan, D.; Agarwal, Neeraj; Gupta, Iti; Ravikanth, M. *Tetrahedron* (2002), 58(26), 5347-5356].

The synthesis of the thioanalogs (X=S) of (IV) and substituted thioanalogs of IV, e.g. α2,α5-alkylated 2,5-bis(hydroxymethyl)tetrahydrothiophenes, has moreover been described [cf. Luttringhaus, A.; Merz, H. *Archiv der Pharmazie and Berichte der Deutschen Pharmazeutischen Gesell-* schaft [Archive of pharmacy and reports of the German Pharmaceutical Society] (1960), 293, 881-890 and, respectively, Block, Eric; Ahmad, Saleem. *Phosph. Sulfur and the Related Elements* (1985), 25(2), 139-145].

Some of the furan- or thiophene-based diols occur in enantiomerically or diastereomerically pure form. The furan- or thiophene-based diols can be used in the form of their pure enantiomers or diastereomers. However, preference is given to mixtures of the respective geometric isomers.

The chlorophosphorus derivatives needed for the synthesis of the flame retardant agonists are usually available commercially or can be prepared by way of synthesis routes well known from the literature [cf. Science of Synthesis (formerly Houben Weyl) 42 (2008); Houben Weyl E1-2 (1982); Houben Weyl 12 (1963-1964)].

The amount generally used of the flame retardant of the invention is in the range from 0.2 to 10 parts by weight, based on the polymer. In particular in the case of foams made of expandable styrene polymers, sufficient flame retardancy is provided by amounts of from 2 to 15 parts by weight, based on the polymer, preferably from 2.5 to 10 parts by weight, based on the polymer.

For the purposes of this application—unless otherwise stated—the parts-by-weight data are always based on 100 parts by weight of the compound, in particular of the polymer, which is rendered flame-retardant, ignoring any additives.

The effectiveness of the flame retardant of the invention can be still further improved through addition of further suitable flame retardant synergists, examples being the thermal free-radical generators dicumyl peroxide, di-tert-butyl peroxide, or dicumyl. The amounts usually used of the flame retardant synergist in this case, based on the polymer, are from 0.05 to 5 parts by weight.

It is also possible to make additional use of further flame retardants, e.g. melamine, melamine cyanurates, metal oxides, metal hydroxides, phosphates, phosphonates, phosphinates, expandable graphite, or synergists, e.g. $Sb_2O_3$, Sn compounds, or compounds which comprise or liberate nitroxyl radicals. Examples of suitable additional halogen-free flame retardants are available commercially as Exolit OP 930, Exolit OP 1312, HCA-HQ, Cyagard RF-1243, Fyrol PMP, Phoslite IP-A, Melapur 200, Melapur MC, and Budit 833.

If complete absence of halogen is not necessary, it is possible to produce reduced-halogen-content materials through use of the flame retardant of the invention and addition of relatively small amounts of halogen-containing, in particular brominated, flame retardants, examples being hexabromocyclododecane (HBCD) or brominated styrene homo- or copolymers/oligomers (e.g. styrene-butadiene copolymers, as described in WO-A 2007/058736), preferably in amounts in the range from 0.05 to 1 part by weight, in particular from 0.1 to 0.5 part by weight (based on the polymer).

In one preferred embodiment, the flame retardant of the invention is halogen-free.

It is particularly preferable that the composition made of polymer, flame retardant, and further additives is halogen-free.

The flame retardant of the invention, i.e. the combination of components a and b, is used in the invention alone and/or in a mixture with synergists, and/or in a mixture with further flame-retardant substances, for producing materials that have been rendered flame-retardant, preferably unfoamed and/or foamed polymers, in particular thermoplastic polymers. To this end, the flame retardant is preferably mixed physically with the corresponding polymer in the melt and then first subjected to a complete compounding process in the form of polymer mixture with phosphorus contents of from 0.05 part by weight to 5 parts by weight (based on the polymer), and then further processed in a second step together with the same polymer or with another polymer.

The invention also provides a preferably thermoplastic polymer composition comprising a flame retardant of the invention (A) and a polymer component (B).

Examples of thermoplastic polymers that can be used are foamed or unfoamed styrene polymers, including ABS, ASA, SAN, AMSAN, polyesters, polyimides, polysulfones, polyolefins, such as polyethylene and polypropylene, polyacrylates, polyether ether ketones, polyurethanes, polycarbonates, polyphenylene oxides, unsaturated polyester resins, phenolic resins, polyamides, polyether sulfones, polyether ketones, and polyether sulfides, respectively individually or in a mixture in the form of polymer blends.

Preference is given to foamed or unfoamed styrene homopolymers and foamed or unfoamed styrene copolymers, respectively individually or in a mixture in the form of polymer blends.

Preference is given to flame-retardant polymer foams, in particular those based on styrene polymers, preferably EPS and XPS.

The density of the flame-retardant polymer foams is preferably in the range from 5 to 150 $kg/m^3$, particularly preferably in the range from 10 to 50 $kg/m^3$. The closed-cell content of the foams is preferably more than 80%, particularly preferably from 90 to 100%.

The flame-retardant, expandable styrene polymers (EPS) and extruded styrene polymer foams (XPS) of the invention can be processed via mixing to incorporate a blowing agent and the flame retardant of the invention into the polymer melt and then extrusion and pelletization under pressure to give expandable pellets (EPS), or via extrusion and depressurization, using appropriately shaped dies, to give foam sheets (XPS) or foam extrudates.

The term styrene polymer in the invention comprises polymers based on styrene, alpha-methylstyrene, or a mixture of styrene and alpha-methylstyrene; this applies analogously to the styrene content in SAN, AMSAN, ABS, ASA, MBS, and MABS (see below).

In one preferred embodiment, the foam is an expandable polystyrene (EPS).

In another preferred embodiment, the foam is an extruded styrene polymer foam (XPS).

The molar mass $M_w$ of expandable styrene polymers is preferably in the range from 120 000 to 400 000 g/mol, particularly preferably in the range from 180 000 to 300 000 g/mol, measured by means of gel permeation chromatography with refractiometric detection (RI) against polystyrene standards. The molar mass of the expandable polystyrene is generally below the molar mass of the polystyrene used by about 10 000 g/mol, because of the molar mass degradation due to shear and/or the effect of temperature.

Styrene polymers preferably used comprise glassclear polystyrene (GPPS), high-impact polystyrene (HIPS), anionically polymerized polystyrene or high-impact polystyrene (AIPS), styrene-alpha-methylstyrene copolymers, acrylonitrile-butadiene-styrene polymers (ABS), styrene-acrylonitrile copolymers (SAN), acrylonitrile-alpha-methylstyrene copolymers (AMSAN), acrylonitrile-styreneacrylate (ASA), methyl acrylate-butadiene-styrene (MBS), methyl methacrylate-acrylonitrile-butadiene-styrene (MABS) polymers, or a mixture thereof, or a mixture with polyphenylene ether (PPE).

In order to improve mechanical properties or thermal stability, the styrene polymers mentioned may be blended with thermoplastic polymers, such as polyamides (PA), polyolefins, such as polypropylene (PP) or polyethylene (PE), polyacrylates, such as polymethyl methacrylate (PMMA), polycarbonate (PC), polyesters, such as polyethylene terephthalate (PET) or polybutylene terephthalate (PBT), polyether sulfones (PES), polyether ketones or polyether sulfides (PES) or a mixture of these, generally in total proportions of up to a maximum of 30% by weight, preferably in the range from 1 to 10% by weight, based on the polymer melt, optionally with use of compatibilizers. Mixtures within the ranges of amounts mentioned are also possible with, by way of example, hydrophobically modified or functionalized polymers or oligomers, rubbers, such as polyacrylates or polydienes, e.g. styrene-butadiene block copolymers, or biodegradable aliphatic or aliphatic/aromatic copolyesters.

Examples of suitable compatibilizers are maleic-anhydride-modified styrene copolymers, polymers containing epoxy groups, and organosilanes.

The styrene polymer melt can also receive admixtures of polymer recyclates of the abovementioned thermoplastic polymers, in particular styrene polymers and expandable styrene polymers (EPS), in amounts which do not substantially impair their properties, generally amounts of at most 50% by weight, in particular amounts of from 1 to 20% by weight.

The styrene polymer melt comprising blowing agent generally comprises one or more blowing agents homogeneously distributed in a total proportion of from 2 to 10% by weight, preferably from 3 to 7% by weight, based on the styrene polymer melt comprising blowing agent. Suitable blowing agents are the physical blowing agents usually used in EPS, such as aliphatic hydrocarbons having from 2 to 7 carbon atoms, alcohols, ketones, ethers, or halogenated hydrocarbons. Preference is given to use of isobutane, n-butane, isopentane, n-pentane. For XPS, it is preferable to use $CO_2$ or a mixture thereof with alcohols and/or with $C_2$-$C_4$ carbonyl compounds, in particular with ketones.

To improve foamability, finely dispersed droplets of internal water may be introduced into the styrene polymer matrix. An example of the method for this is the addition of water into the molten styrene polymer matrix. The location of addition of the water may be upstream of, together with, or downstream of, the blowing agent feed. Homogeneous distribution of the water may be achieved by using dynamic or static mixers. An adequate amount of water, based on the styrene polymer, is generally from 0 to 2% by weight, preferably from 0.05 to 1.5% by weight.

Expandable styrene polymers (EPSs) with at least 90% of the internal water in the form of droplets of internal water with diameter in the range from 0.5 to 15 µm form, on foaming, foams with an adequate number of cells and with homogeneous foam structure.

The amount added of blowing agent and of water is selected in such a way that the expansion capability a of the expandable styrene polymers (EPSs), defined as bulk density prior to foaming/bulk density after foaming, is at most 125, preferably from 15 to 100.

The bulk density of the expandable styrene polymer pellets (EPSs) of the invention is generally at most 700 g/l, preferably in the range from 590 to 660 g/l. If fillers are used, bulk densities in the range from 590 to 1200 g/l may arise, depending on the nature and amount of the filler.

Additives, nucleating agents, fillers, plasticizers, soluble and insoluble inorganic and/or organic dyes and pigments, e.g. athermanous substances, i.e. IR absorbers, such as carbon black, graphite or aluminum powder may moreover be added, together or with spatial separation, to the styrene polymer melt, e.g. by way of mixers or ancillary extruders. The amounts added of the dyes and pigments are generally in the range from 0.01 to 30 parts by weight, preferably in the range from 1 to 5 parts by weight. For homogeneous and microdisperse distribution of the pigments within the styrene polymer, it can be advantageous, particularly in the case of polar pigments, to use a dispersing agent, e.g. organosilanes, polymers containing epoxy groups, or maleic-anhydride-grafted styrene polymers. Preferred plasticizers are mineral oils and phthalates, which may be used in amounts of from 0.05 to 10 parts by weight, based on the styrene polymer.

To produce the expandable styrene polymers of the invention, the blowing agent can be incorporated by mixing into the polymer melt. One possible process comprises the following stages: a) melt production, b) mixing, c) cooling, d) transport, and e) pelletizing. Each of these stages may be executed using the apparatus or combinations of apparatus known from plastics processing. Static or dynamic mixers, such as extruders, are suitable for this mixing process. The polymer melt may be taken directly from a polymerization reactor, or produced directly in the mixing extruder, or in a separate melting extruder via melting of polymer pellets. The cooling of the melt may take place in the mixing assemblies or in separate coolers. Examples of pelletizers which may be used are pressurized underwater pelletizers, a pelletizer with rotating knives and cooling via spray-misting of temperature-control liquids, or pelletizers involving atomization. Examples of suitable arrangements of apparatus for carrying out the process are:

a) polymerization reactor-static mixer/cooler-pelletizer
b) polymerization reactor-extruder-pelletizer
c) extruder-static mixer-pelletizer
d) extruder-pelletizer The arrangement may also have ancillary extruders for introducing additives, e.g. solids or heat-sensitive additives.

The temperature of the styrene polymer melt comprising blowing agent when it is passed through the die plate is generally in the range from 140 to 300° C., preferably in the range from 160 to 240° C. There is no need for cooling down to the region of the glass transition temperature.

The die plate is heated at least to the temperature of the polystyrene melt comprising blowing agent. It is preferable that the temperature of the die plate is in the range from 20 to 100° C. above the temperature of the polystyrene melt comprising blowing agent. This prevents polymer deposits within the dies and provides problem-free pelletization.

In order to obtain marketable pellet sizes, the diameter (D) of the die holes at the exit from the die should be in the range from 0.2 to 1.5 mm, preferably in the range from 0.3 to 1.2 mm, particularly preferably in the range from 0.3 to 0.8 mm. This permits controlled setting of pellet sizes below 2 mm, in particular in the range from 0.4 to 1.4 mm, even after die swell.

Particular preference is given to a process which comprises the following steps for the production of expandable styrene polymers (EPS) rendered flame-retardant by a halogen-free method:

a) mixing to incorporate an organic blowing agent and from 1 to 25% by weight of the flame retardant of the invention into the polymer melt by means of a static or dynamic mixer at a temperature of at least 150° C., b) cooling of the styrene polymer melt comprising blowing agent to a temperature of at least 120° C.,
c) discharge through a die plate with holes, the diameter of which at the exit from the die is at most 1.5 mm, and
d) pelletization of the melt comprising blowing agent directly behind the die plate under water at a pressure in the range from 1 to 20 bar.

It is also possible to produce the expandable styrene polymers (EPS) of the invention via suspension polymerization in aqueous suspension in the presence of the flame retardant of the invention and of an organic blowing agent.

In the suspension polymerization process, it is preferable to use styrene alone as monomer. However, up to 20% of its weight can have been replaced by other ethylenically unsaturated monomers, such as alkylstyrenes, divinylbenzene, acrylonitrile, 1,1-diphenyl ether or α-methylstyrene.

The usual auxiliaries can be added during the suspension polymerization process, examples being peroxide initiators, suspension stabilizers, blowing agents, chain-transfer agents, expansion aids, nucleating agents, and plasticizers. The amounts of flame retardant of the invention added in the polymerization process are from 0.5 to 25% by weight, preferably from 5 to 15% by weight. The amounts of blowing agents added are from 3 to 10% by weight, based on monomer. These amounts can be added prior to, during, or after polymerization of the suspension. Examples of suitable blowing agents are aliphatic hydrocarbons having from 4 to 6 carbon atoms. It is advantageous to use inorganic Pickering dispersants as suspension stabilizers, an example being magnesium pyrophosphate or calcium phosphate.

The suspension polymerization process produces bead-shaped particles which are in essence round, with average diameter in the range from 0.2 to 2 mm.

In order to improve processability, the finished expandable styrene polymer pellets can be coated with glycerol ester, antistatic agent, or anticaking agent.

The EPS pellets can be coated with glycerol monostearate GMS (typically 0.25%), glycerol tristearate (typically 0.25%), Aerosil 8972 fine-particle silica (typically 0.12%), or Zn stearate (typically 0.15%), or else antistatic agent.

The expandable styrene polymer pellets of the invention can be prefoamed in a first step by means of hot air or steam to give foam beads with density in the range from 5 to 150 kg/m³, in particular from 10 to 50 kg/m³, and can be fused in a second step in a closed mold, to give molded particles.

The expandable polystyrene particles can be processed to give polystyrene foams with densities of from 8 to 150 kg/m³, preferably from 10 to 50 kg/m³ (measured to ISO 845). To this end, the expandable beads are prefoamed. This is mostly achieved by heating of the beads, using steam in what are known as prefoamers. The resultant prefoamed beads are then fused to give moldings. To this end, the prefoamed beads are introduced into molds which do not have a gas-tight seal, and are treated with steam. The moldings can be removed after cooling.

In another preferred embodiment, the foam is an extruded polystyrene (XPS), obtainable via:
a) heating of a polymer component P to form a polymer melt,
b) introduction of a blowing agent component T into the polymer melt to form a foamable melt,
c) extrusion of the foamable melt into a region of relatively low pressure with foaming to give an extruded foam, and
d) addition of the flame retardant of the invention and also, optionally, of further auxiliaries and additives, in at least one of the steps a) and/or b).

Foams of the invention based on styrene polymers, in particular EPS and XPS, are suitable by way of example for use as insulation materials, in particular in the construction industry. A preferred use is as halogen-free insulation material, in particular in the construction industry.

The extinguishment time (DIN 4102 B2 fire test for foam density 15 g/l and aging time 72 h) of foams of the invention, in particular those based on styrene polymers, such as EPS and XPS, is preferably ≤15 sec, particularly preferably 10 sec, and they thus satisfy the conditions for passing said fire test, as long as the flame height does not exceed the test level stated in the standard.

The examples below provide further explanation of the invention, but with no restriction.

EXAMPLES

Component a) Di- and Polysulfides

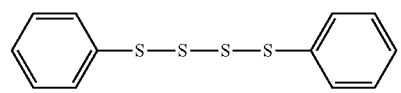

Diphenyl tetrasulfide

SC1

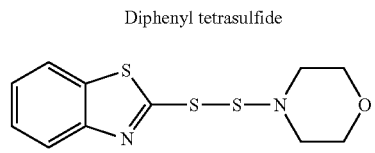

4-(2-Benzothiazoledithio)morpholine

SC2

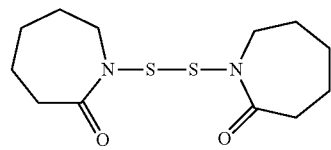

Dicaprolactam disulfide

SC3

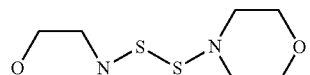

Morpholine disulfide

SC4

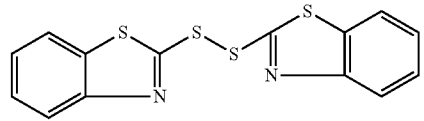

2,2-Dithiobis(benzothiazole)

SC5

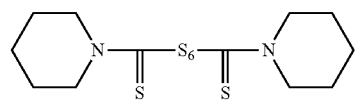

Dipentamethylenethiuram hexasulfide

SC6

Component b) Phosphorus Compounds

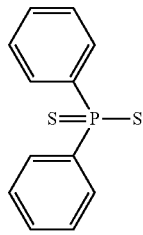

Diphenyldithiophosphinous acid

PC1

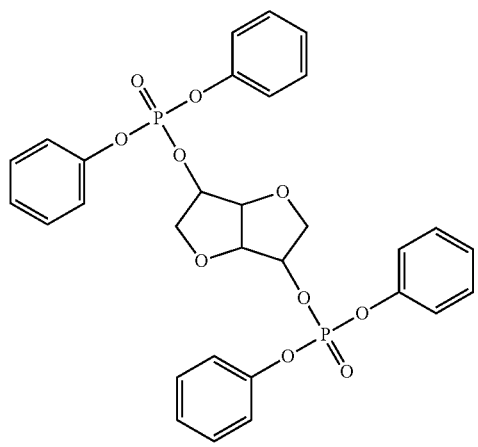

Diphenyl 6-(diphenoxyphosphoryloxy)hexa-hydrofuro[3,2-b]furan-3-yl phosphate

PC2

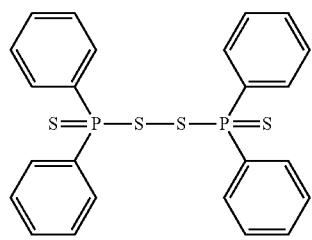

Bis(diphenylphosphinothioyl)disulfide

PC3

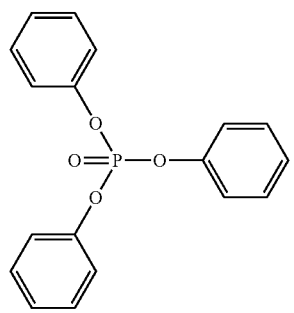

Triphenyl phosphate

PC4

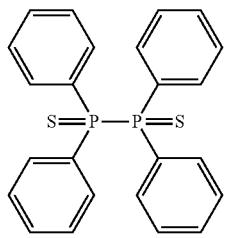

1,1,2,2-Tetraphenyldiphosphine disulfide

PC5

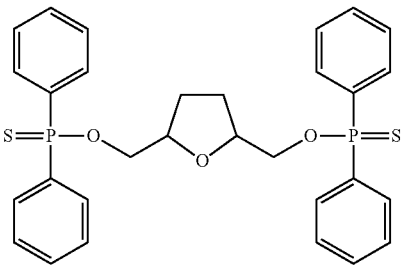

2,3,4,5-Tetrahydrofuran-2,5-yldimethyl 2,5-bis(diphenylthiophosphinate)

PC6

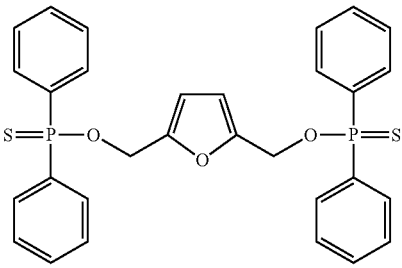

Furan-2,5-yldimethyl 2,5-bis(diphenylphosphinate)

PC7

The organophosphorus compounds PC1-7 used in the examples were synthesized by known methods or were purchased:
PC1: purchased from ABCR
PC2:
Synthesis of isosorbide bis(diphenyl phosphate):
Apparatus:
4000 ml stirred apparatus, inertization with argon
Mixture:
298.2 g (2.0 mol) of isosorbide, 98%
506 g (5.0 mol) of triethylamine
2000 mL of toluene, and
1120 g (4.0 mol) of chlorodiphenyl phosphate, 96%

Molten isosorbide (298.2 g, 2 mol) is introduced into toluene (2000 mL) at RT in a 4 L standard stirred apparatus. During this process, most of the isosorbide reprecipitates. The mixture is heated to 80° C. (90% of the isosorbide having dissolved). The solution is then allowed to return to RT. Chlorodiphenyl phosphate (1120 g, 4.0 mol) is added dropwise within a period of 5 h at from 22 to 42° C. Stirring of the cloudy, yellow mixture is continued overnight at RT. Monitoring of the reaction via 31P NMR indicates quantitative conversion.

The precipitated triethylammonium chloride is removed by suction filtration by way of a (nitrogen-inertized) Schlenck frit, and is then washed with toluene (1×300 mL). The filtrate is shaken with saturated aqueous Na$_2$CO$_3$ solution (2×500 mL), and then washed with water (2×500 mL) and dried overnight over Na$_2$SO$_4$. The Na$_2$SO$_4$ is removed by suction filtration and then washed with toluene (1×300 mL). The filtrate is concentrated in vacuo on a rotary evaporator (65° C., 77 mbar), and then dried for 4 h at 80° C. under the vacuum provided by an oil pump.

The product is obtained in the form of a reddish-brown oil (1046 g, 86% of theory), with purity >96% (based on 31P NMR).

The pH of an aqueous emulsion of the product was 5.0.
Analytical Data:
$^{31}$P NMR (toluene$_{d8}$), [ppm]:−112 (d, $^3J_{P,H}$=7 Hz), −11.9 (d, $^3J_{P,H}$=7 Hz) (2 isomers). $^1$H NMR (toluene$_{d8}$), [ppm]: 7.37-7.22 (m, 8H, ar), 7.16-7.00 (m, 8H, ar), 7.00-6.89 (m, 4H, ar), 5.15-5.01 (m, 1H, CH$_{isosorbide}$), 4.95-4.82 (m, 1H, CH$_{isosorbide}$), 4.62-4.52 (m, 1H, CH$_{isosorbide}$), 4.50-4.40 (m, 1H, CH$_{isosorbide}$), 4.08-3.96 (m, 1H, CH$_{isosorbide}$), 3.83-3.71 (m, 1H, CH$_{isosorbide}$), 3.69-3.59 (m, 1H, CH$_{isosorbide}$), 3.59-3.47 (m, 1H, CH$_{isosorbide}$).
PC3: M. G. Zimin; N. G. Zabirov; V. Smirnov. Zhournal Obschei Khimii; 1980; 50; 1; 24-30.
PC4: Disflamoll TP from Lanxess
PC5: W. Kuchen, H. Buchwald. Chem. Ber., 1958, 91, 2871-2877.
PC6: HCA from Sanko
PC6:

Production of 2,3,4,5-tetrahydrofuran-2,5-yldimethyl 2,5-bis(diphenylthio-phosphinate)

Apparatus:
1 L four-necked round-bottomed flask with stirrer with precision glass gland, reflux condenser with bubble counter and Ar inlet, thermometer, and dropping funnel.
Mixture:

| 29.1 g | (0.22 mol) | of 2,5-bis(hydroxymethyl)-2,3,4,5-tetrahydrofuran |
| 116.0 g | (0.45 mol, 2.08 eq.) | of diphenylthiophosphinoyl chloride |
| 36.9 g | (0.45 mol, 2.08 eq.) | of N-methylimidazole |
| 300 mL | | of toluene. |

Method:
2,5-Bis(hydroxymethyl)-2,3,4,5-tetrahydrofuran (29 g, 0.22 mol) is dissolved in 300 mL of toluene. N-Methylimidazole (36.9 g, 0.45 mol, 2.1 eq.) is added to the solution, and diphenylthiophosphinoyl chloride (116.0 g, 0.45 mol, 2.1 eq.) is added dropwise within a period of 45 minutes. During this process, the temperature rises from 24° C. to 43° C. The mixture is heated to 100° C. for 24 hours. The solution is then allowed to cool to RT. Once the N-methylimidazole hydrochloride has crystallized out, the liquid is removed by decanting, and the organic phase is washed first with 1.5% strength HCl solution (150 mL), then with water (200 mL), and finally with 7.5% strength NaHCO$_3$ solution (2×150 mL). The organic phase is dried over Na$_2$SO$_4$. Once the desiccant has been removed by filtration, the solvent is removed in vacuo. The crude product, a reddish-brown oily solid (129.6 g, 104%) is purified by silica-gel filtration (eluent: n-hexane/EE 1:0-1:1).

The product is obtained in the form of brown oil (88.1 g, 71%) at 97% purity (based on $^{31}$P NMR).
Analytical Data:
$^1$H NMR (360 MHz, CDCl$_3$, 300 K): =1.65-1.80 (m, 2H, CH$_{2,THF}$), 1.82-2.00 (m, 2H, CH$_{2,THF}$), 3.90-4.04 (m, 4H, CH$_{2,methylene}$), 4.15-4.30 (m, 2H, CH$_{THF}$), 7.32-7.43 (m, 12H, CH$_{m,p}$), 7.82-7.93 (m, 8H, CH$_o$) ppm.
$^{13}$C NMR (125 MHz, CDCl$_3$, 300 K): δ=27.45 (s, CH$_{2,THF}$), 66.33 (d, CH$_{2,methylene}$, $^2J_{C-P}$=6.0 Hz), 78.14 (d, CH$_{THF}$, $^3J_{C-P}$=8.6 HZ), 128.23 (d, CH$_{m,isomer1/2}$, $^3J_{C-P}$=4.6 Hz), 128.34 (d, CH$_{m,isomer1/2}$, $^3J_{C-P}$=4.0 Hz), 130.94 (d, CH$_{o,isomer1/2}$, $^2J_{C-P}$=13.8 Hz), 131.03 (d, CH$_{o,isomer1/2}$, $^3J_{C-P}$=13.8 Hz), 131.70 (d, CH$_{p,isomer1/2}$, $^4J_{C-P}$=2.9 Hz), 131.74 (d, CH$_{p,isomer1/2}$, $^4J_{C-P}$=2.9 Hz), 133.62 (d, CH$_{i,isomer1/2}$, $^1J_{C-P}$=27.0 Hz), 134.50 (d, CH$_{i,isomer1/2}$, $^1J_{C-P}$=27.0 Hz) ppm.
$^{31}$P NMR (145 MHz, CDCl$_3$, 300 K): δ=83.225 (m) ppm.
ESI(+)-HRMS (m/z): calc.: 533.1647 [C$_{30}$H$_{31}$O$_5$P$_2$]$^+$
found: 533.1629 [M+H]$^+$.

PC7: Production of furan-2,5-yldimethyl 2,5-bis(diphenylphosphinate)

Apparatus:
1 L four-necked round-bottomed flask with stirrer with precision glass gland, reflux condenser with bubble counter and N2 inlet, thermometer, and dropping funnel.
Mixture:

| 23.0 g | (0.18 mol) | of 2,5-bis(hydroxymethyl)furan |
| 86.9 g | (0.36 mol, 2.0 eq.) | of diphenylphosphinoyl chloride |
| 40.6 g | (0.40 mol, 2.2 eq.) | of triethylamine |
| 300 mL | | of toluene. |

Method:
2,5-Bis(hydroxymethyl)furan (23 g, 0.18 mol) is very substantially dissolved (but does not dissolve completely) in 300 ml of toluene. Triethylamine (40.6 g, 0.4 mol, 2.2 eq.) is added to the suspension, and diphenylphosphinoyl chloride (87 g, 0.36 mol, 2.0 eq.) is added dropwise. The temperature rises from 23° C. to 33° C. within a period of 25 min (about ⅓ of dropwise addition). The mixture is then cooled (down) to 27° C. with cold water, and the rate of dropwise addition is adjusted so as to maintain 27° C. The mixture is stirred at room temperature for a total of three days.

For work-up, the mixture is washed with 7.5% strength NaHCO$_3$ solution (2×250 mL) and water (250 mL), and then dried over Na$_2$SO$_4$, and the solvent is finally removed in vacuo. The crude product is taken up again in 300 ml of CH$_2$Cl$_2$ and stirred with 500 ml of 7.5% strength NaHCO$_3$ solution for three hours. The phases are separated, and the organic phase is dried over Na$_2$SO$_4$. The solvent is removed in vacuo, and the product is obtained in the form of brown solid (79 g, 83%) at >99% purity (based on $^{31}$P NMR).
Analytical Data:
$^1$H NMR (500 MHz, toluene-d$_8$, 300 K): =4.789 (d, 4H, CH$_2$, 3JP-H=8.2 Hz), 5.892 (s, 2H, CHfuran), 7.01-7.07 (m, 12H, CHm, p), 7.82-7.87 (m, 8H, CHo) ppm.
$^{13}$C NMR (125 MHz, toluene-d$_8$, 300 K): δ=58.13 (d, CH2, 2JC-P=5.2 Hz), 111.57 (s, CH), 128.58 (d, CHm, 3JC-P=13.2 Hz), 131.91 (d, CHp, 4JC-P=2.9 Hz), 132.05 (d, CHo, 2JC-P=9.7 Hz), 133.02 (d, CHi, 1JC-P=135.4 Hz) ppm.
$^{31}$P NMR (145 MHz, toluene-d$_8$, 300 K): δ=31,167 (m) ppm.
ESI(+)-HRMS (m/z): calc.: 529.1334 [C30H27O5P2]+
found: 529.1328 [M+H]$^+$.
TGA (under argon): 155° C. (2% loss of mass), 160° C. (5% loss of mass), 200° C. (10% loss of mass).

Sulfur compounds SC1 to SC6 were used in the examples.

The organic polysulfides used in the examples were synthesized by known methods or purchased:
SC1:
Production of Diphenyl Tetrasulfide
As described in: Zysman-Colman, Eli; Harpp, David N. *J. Org. Chem.*; 2003; 68; 6; 2487-2489.
SC2: purchased from ABCR
SC3: purchased from Raschig
SC4: purchased from ABCR
SC5: purchased from ABCR
SC6: purchased from Pfaltz & Bauer
Description of Tests:
The fire performance of the foam sheets was determined with foam density 15 kg/m$^3$ to DIN 4102 (B2 fire test).
Hexabromocyclododecane (hereinafter termed HBCD) was used as comparative example.
Expandable Styrene Polymers
7 parts by weight of n-pentane were incorporated by mixing into a polystyrene melt made of PS 148H (Mw=240 000 g/mol, Mn=87 000 g/mol, determined by means of GPC, RI detector, PS as standard) from BASF SE, with intrinsic viscosity IV of 83 ml/g. Once the melt comprising blowing agent had cooled from initially 260° C. to a temperature of 190° C., a polystyrene melt comprising the flame retardants mentioned in the table was incorporated into the main stream by mixing by way of an ancillary extruder.
The amounts stated in parts by weight are based on the entire amount of polystyrene.
The mixture made of polystyrene melt, blowing agent, and flame retardant was conveyed at 60 kg/h through a die plate with 32 holes (diameter of dies 0.75 mm). Compact pellets with narrow size distribution were produced by pressurized underwater pelletization.
The molar mass of the pellets was 220 000 g/mol (Mw) and, respectively, 80 000 g/mol (Mn) (determined by means of GPC, RI detector, PS as standard). The pellets were prefoamed by exposure to a stream of steam and, after 12 hours of storage, fused in a closed mold by further treatment with steam to give foam slabs of density 15 kg/m$^3$. The fire performance of the foam sheets was determined after 72 hours of storage with a foam density of 15 kg/m$^3$ to DIN 4102.
Table 1 collates the results:

TABLE 1

Fire performance of polymer composition of the invention (inventive examples) and of comparative examples

| Ex. | Flame retardant (parts by weight) | Fire test (B2 to DIN 4102)/ Extinguishment time (s) |
|---|---|---|
| CE1 | 4 – HBCD (comparison) | passed/6.4 s |
| CE2 | 8 PC 1 | passed/5.3 s |
| 1 | 3.5 – PC 1 + 4 – SC 4 | passed/7.7 s |
| 2 | 3.5 – PC 1 + 4 – SC 6 | passed/6.9 s |
| CE3 | 15 – PC 2 | failed/consumed by combustion |
| 3 | 3 – PC 2 + 4 – SC 5 | passed/7.3 s |
| 4 | 3 – PC 2 + 4 – SC 2 | passed/11.2 s |
| 5 | 3 – PC 2 + 4 – SC 3 | passed/8.9 s |
| CE4 | 8 – PC 3 | passed/5.0 s |
| 6 | 2 – PC 3 + 5 – SC 5 | passed/8.9 s |
| CE5 | 20 – PC 4 | failed/consumed by combustion |
| 7 | 5 – PC 4 + 4 – SC 6 | passed/10.1 s |
| 8 | 5 – PC 4 + 4 – SC 3 | passed/7.8 s |
| CE6 | 8 – PC 5 | passed/5.1 s |
| 9 | 2.5 – PC 5 + 3 – SC 1 | passed/5.8 s |
| 10 | 2.5 – PC 5 + 5 – SC 4 | passed/11.1 s |
| CE7 | 15 – PC 6 | passed/8.7 s |
| 11 | 3 – PC 6 + 2 – SC 1 | passed/9.0 s |
| CE8 | 15 – PC 7 | failed/consumed by combustion |
| 12 | 4.5 – PC 7 + 3 – SC 1 | passed/8.9 s |
| CE9 | — | failed/consumed by combustion |

TABLE 2

Effect of foam density of polystyrene foam test specimens produced from EPS on fire result. The parts described in the examples are parts by weight.

| Ex. | Flame retardant (parts by weight) | Foam density [kg/m$^3$] (ISO 845) | Fire test (B2 to DIN 4102)/ Extinguishment time (s) |
|---|---|---|---|
| 3 | 3 PC 2 + 4 SC 5 | 15.2 | passed/7.3 s |
| 13 | 3 PC 2 + 4 SC 5 | 62.4 | passed/11.9 s |
| 14 | 3 PC 2 + 4 SC 5 | 110.8 | passed/14.2 s |

TABLE 3

Compressive stress for polystyrene foam test specimens produced from EPS (for 10% compression) with a foam density of 15 kg/m$^3$. The parts described in the examples are parts by weight.

| Ex. | Flame retardant (parts by weight) | Compressive stress (kPa) (ISO 844) | Fire test (B2 to DIN 4102)/ Extinguishment time (s) |
|---|---|---|---|
| CE1 | 4 – HBCD | 75.2 | passed/6.4 s |
| CE6 | 8 – PC 5 | 68.7 | passed/5.1 s |
| 9 | 2.5 – PC 5 + 3 – SC 1 | 73.4 | passed/5.8 s |
| CE7 | 15 – PC 6 | 63.2 | passed/8.7 s |
| 11 | 3 – PC 6 + 2 – SC 1 | 75.6 | passed/9.0 s |

TABLE 4

Fire performance of polystyrene foam test specimens produced from EPS with foam density of 15 kg/m$^3$.

| Ex. | Flame retardant (parts by weight) | Graphite (parts by weight) | Chalk (parts by weight) | Fire test (B2 to DIN 4102)/Extinguishment time (s) |
|---|---|---|---|---|
| CE1 | 4 – HBCD | 0 | 0 | passed/6.4 s |
| CE10 | 4 – HBCD | 4 | 0 | failed/consumed by combustion |
| 15 | 4 – HBCD | 0 | 4 | failed/consumed by combustion |
| CE11 | 8 – HBCD | 4 | 0 | passed/7.3 s |
| 16 | 8 – HBCD | 0 | 4 | passed/5.8 s |
| 3 | 3 PC 2 + 4 SC 5 | 0 | 0 | passed/7.3 s |
| 17 | 3 PC 2 + 4 SC 5 | 4 | 0 | passed/8.9 s |
| 18 | 3 PC 2 + 4 SC 5 | 0 | 4 | passed/9.8 s |

Graphite: UF2 98 from Kropfmühl
Chalk: Hydrocarb OG from Omya

Extruded Polystyrene Foam Sheets
100 parts by weight of polystyrene 158K (Mw=261 000 g/mol, Mn=77 000 g/mol, determined by means of GPC, RI detector, PS as standard) from BASF SE with an intrinsic viscosity of 98 ml/g, 0.1 part of talc as nucleating agent to regulate cell size, and the number of parts stated in the table of flame retardants, and also optionally sulfur, are introduced continuously into an extruder with an internal screw diameter of 120 mm. A blowing agent mixture made of 3.25 parts by weight of ethanol and 3.5 parts by weight of $CO_2$ is continuously and simultaneously injected through an inlet aperture in the extruder. The gel uniformly kneaded at 180° C. in the extruder is conducted through a relaxation zone and, after a residence time of 15 minutes, extruded at a discharge temperature of 105° C. through a die of width 300 mm and height 1.5 mm, into the atmosphere. The foam is conducted through a calibrator connected to the extruder, whereupon the web of foam sheet produced has a cross section of 650 mm×50 mm and a density of 35 g/l. The molar mass of the polystyrene was 240 000 g/mol (Mw) and, respectively, 70 000 g/mol (Mn) (determined by means of GPC, RI detector, PS as standard). The product was chopped to give sheets. The fire performance of the specimens was tested using thicknesses of 10 mm after 30 days of lying time, to DIN 4102.

Table 0.5 collates the results from the examples.

TABLE 5

| Ex. | Flame retardant (% by weight) | Fire test (B2 to DIN 4102)/ Extinguishment time (s) |
|---|---|---|
| CE12 | 4 – HBCD (comparison) | passed/9.4 s |
| CE13 | 8 – PC 1 | passed/6.4 s |
| 19 | 2.5 – PC 1 + 5.0 – SC 4 | passed/8.9 s |
| CE14 | 15 – PC 2 | failed/consumed by combustion |
| 20 | 3.0 – PC 2 + 5.0 – SC 5 | passed/9.9 s |
| CE15 | 8 – PC 3 | passed/9.8 s |
| 21 | 2.5 – PC 3 + 5.0 – SC 2 | passed/11.7 s |
| CE16 | 20 – PC 4 | failed/consumed by combustion |
| 22 | 5 – PC 4 + 5.0 – SC 3 | passed/11.3 s |
| CE17 | — | failed/consumed by combustion |

The invention claimed is:

1. A halogen-free flame retardant comprising
a) at least one sulfur compound of the formula (I)

wherein $A^1$ and $A^2$ are identical or different, being $C_6$-$C_{12}$-aryl, cyclohexyl, $Si(OR^a)_3$, a saturated, partially unsaturated, or aromatic, mono- or bicyclic ring having from 3 to 12 ring members and comprising one or more heteroatoms from the group of N, O, and S, where the system is unsubstituted or has substitution by one or more substituents of the group of O, OH, S, SH, $COOR^b$, $CONR^cR^d$, $C_1$-$C_{18}$-alkyl, $C_1$-$C_{18}$-alkoxy, $C_1$-$C_{18}$-thioalkyl, $C_6$-$C_{12}$-aryl, $C_6$-$C_{12}$-aryloxy, $C_2$-$C_{18}$-alkenyl, $C_2$-$C_{18}$-alkenoxy, $C_2$-$C_{18}$-alkynyl, or $C_2$-$C_{18}$-alkinoxy;

$Z^1$ and $Z^2$ are identical or different, being —CO— or —CS—;

$R^a$ is $C_1$-$C_{18}$-alkyl;

$R^b$, $R^c$, and $R^d$ are identical or different, being H, $C_1$-$C_{18}$-alkyl, $C_6$-$C_{12}$-aryl, or an aromatic, mono- or bicyclic ring having from 3 to 12 ring members and comprising one or more heteroatoms from the group of N, O, and S;

m and p are identical or different, being 0 or 1, and n is a natural number from 2 to 10, and b) at least one halogen-free organophosphorus compound having phosphorus content in the range from 5 to 80% by weight, based on the phosphorus compound, where the phosphorus compound(s) have been selected from:

phosphorus compounds of the formula (II)

wherein $R^1$ is $C_1$-$C_{16}$-alkyl, $C_1$-$C_{10}$-hydroxyalkyl, $C_2$-$C_{16}$-alkenyl, $C_1$-$C_{16}$-alkoxy, $C_2$-$C_{16}$-alkenoxy, $C_3$-$C_{10}$-cycloalkyl, $C_3$-$C_{10}$-cycloalkoxy, $C_6$-$C_{10}$-aryloxy, $C_6$-$C_{10}$-aryl-$C_1$-$C_{16}$-alkyl, $C_6$-$C_{10}$-aryl-$C_1$-$C_{16}$-alkoxy, $SR^9$, $COR^{10}$, $COOR^{11}$, or $CONR^{12}R^{13}$;

$R^2$ is $C_1$-$C_{16}$-alkyl, $C_1$-$C_{10}$-hydroxyalkyl, $C_2$-$C_{16}$-alkenyl, $C_1$-$C_{16}$-alkoxy, $C_2$-$C_{16}$-alkenoxy, $C_3$-$C_{10}$-cycloalkyl, $C_3$-$C_{10}$-cycloalkoxy, $C_6$-$C_{10}$-aryl, $C_6$-$C_{10}$-aryl-$C_1$-$C_{16}$-alkyl, $C_6$-$C_{10}$-aryl-$C_1$-$C_{16}$-alkoxy, $SR^9$, $COR^{10}$, $COOR^{11}$, or $CONR^{12}R^{13}$;

$R^3$ is H, SH, $SR^4$, OH, $OR^5$, or a —$(Y^1)_n$—[P(=$X^2$)$_u$$R^6$—($Y^2$)$_n$]$_m$—P(=$X^3$)$_t$$R^7R^8$ group;

or two groups $R^1$, $R^2$, $R^3$ form, together with the phosphorus atom bonded thereto, a ring system;

$X^1$, $X^2$ and $X^3$ are identical or different, being, independently of one another, O or S;

$Y^1$ and $Y^2$ are identical or different, being O or S;

$R^4$, $R^5$, $R^9$, $R^{10}$, $R^{11}$, $R^{12}$, and $R^{13}$ are identical or different, being $C_1$-$C_{12}$-alkyl, $C_3$-$C_8$-cycloalkyl, which may either have no substitution or may have one or more $C_1$-$C_4$-alkyl groups as substituents, or being $C_2$-$C_{12}$-alkenyl, $C_2$-$C_{12}$-alkynyl, $C_6$-$C_{10}$-aryl, or $C_6$-$C_{10}$-aryl-$C_1$-$C_4$-alkyl;

$R^6$, $R^7$, and $R^8$ are identical or different, being, independently of one another, $C_1$-$C_{16}$-alkyl, $C_2$-$C_{16}$-alkenyl, $C_1$-$C_{16}$-alkoxy, $C_2$-$C_{16}$-alkenoxy, $C_3$-$C_{10}$-cycloalkyl, $C_3$-$C_{10}$-cycloalkoxy, $C_6$-$C_{10}$-aryl, $C_6$-$C_{10}$-aryloxy, $C_6$-$C_{10}$-aryl-$C_1$-$C_{16}$-alkyl, $C_6$-$C_{10}$-aryl-$C_1$-$C_{16}$-alkoxy, $SR^9$, $COR^{10}$, $COOR^{11}$ or $CONR^{12}R^{13}$;

n is 0 or 1 if $Y^1$ and, respectively, $Y^2$ is O, and is 1, 2, 3, 4, 5, 6, 7, or 8 if $Y^1$ and, respectively, $Y^2$ is S;

m is an integer from 0 to 100; and s, t, and u are, independently of one another, 0 or 1, and phosphorus compounds of the formula (III)

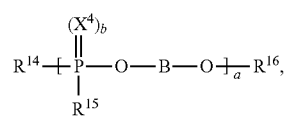

wherein
B is a

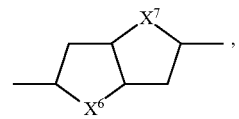

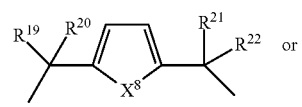

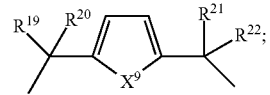

group;

$R^{16}$ is —P(=$X^5$)$_c$$R^{17}R^{18}$, H, a straight-chain or branched $C_1$-$C_{12}$-alkyl group, $C_5$-$C_6$-cycloalkyl, $C_6$-$C_{12}$-aryl, or benzyl, where the four last-mentioned groups are unsubstituted or have substitution by one or more radicals from the group of $C_1$-$C_4$-alkyl and $C_2$-$C_4$-alkenyl;

$R^{14}$, $R^{15}$, $R^{17}$, and $R^{18}$ are identical or different, being hydrogen, OH, $C_1$-$C_{16}$-alkyl, $C_2$-$C_{16}$-alkenyl, $C_1$-$C_{16}$-alkoxy, $C_2$-$C_{16}$-alkenoxy, $C_3$-$C_{10}$-cycloalkyl, $C_3$-$C_{10}$-cycloalkoxy, $C_6$-$C_{10}$-aryl, $C_6$-$C_{10}$-aryloxy, $C_6$-$C_{10}$-aryl-$C_1$-$C_{16}$-alkyl, $C_6$-$C_{10}$-aryl-$C_1$-$C_{16}$-alkoxy, $SR^{23}$, $COR^{24}$, $COOR^{25}$, $CONR^{26}R^{27}$, or two radicals $R^{14}$, $R^{15}$, $R^{17}$, or $R^{18}$ form, together with the phosphorus atom bonded thereto, or with a P—O—B—O—P group, a ring system;

$R^{19}$, $R^{20}$, $R^{21}$, and $R^{22}$ are identical or different, being H, $C_1$-$C_{16}$-alkyl, $C_2$-$C_{16}$-alkenyl, $C_1$-$C_{16}$-alkoxy or $C_2$-$C_{16}$-alkenoxy;

$R^{23}$, $R^{24}$, $R^{25}$, $R^{26}$, and $R^{27}$ are identical or different, being H, $C_1$-$C_{16}$-alkyl, $C_2$-$C_{16}$-alkenyl, $C_6$-$C_{10}$-aryl, $C_6$-$C_{10}$-aryl-$C_1$-$C_{16}$-alkyl or $C_6$-$C_{10}$-aryl-$C_1$-$C_{16}$-alkoxy;

$X^4$ and $X^5$ are identical or different, being S or O;

b and c are identical or different, being 0 or 1;

$X^6$, $X^7$, $X^8$, and $X^9$ are identical or different, being S or O, and a is a natural number from 1 to 50 in an a:b ratio by weight of from 1:10 to 10:1.

2. The flame retardant according to claim 1, wherein $A^1$ and $A^2$ are identical or different, being phenyl, biphenyl, naphthyl, a 5- to 8-membered saturated ring having one or two heteroatoms from the group of N, S, and O, or a 5- to 10-membered, mono- or bicyclic aromatic ring having from 1 to 4 heteroatoms from the group of N, S, and O, where the five ring systems mentioned are identical or different, being unsubstituted or having substitution by one or more substituents from the group of O, OH, $C_1$-$C_{12}$-alkoxy, $C_2$-$C_{12}$-alkenyloxy, and $COOR^b$;

$Z^1$ and $Z^2$ are identical or different, being —CO— or —CS—;

$R^b$ is H, $C_1$-$C_{12}$-alkyl, $C_6$-$C_{10}$-aryl, or an aromatic 5- or 6-membered ring comprising one or more heteroatoms from the group of N, O, and S;

m and p are 0 or 1, and n is a natural number from 2 to 10.

3. The flame retardant according to claim 1, wherein $A^1$ and $A^2$ are identical or different, being

[chemical structures]

$Z^1$ and $Z^2$ are —CS—;

m and p are identical or different and are 0 or 1, and n is 2, 4 or 6.

4. The flame retardant according to claim 1, wherein the compound of the formula (I) is selected from the group consisting of

[chemical structures I-1, I-2, I-3, I-4, I-5, I-6, I-7]

5. A process for rendering foamed or unfoamed polymers flame-retardant, which comprises producing a melt of the polymer and mixing with the flame retardant according to claim 1.

6. A polymer composition comprising one or more polymers and the flame retardant according to claim 1.

7. The polymer composition according to claim 6, comprising from 0.2 to 10 parts by weight (based on 100 parts by weight of polymer) of the flame retardant.

8. The polymer composition according to claim 6, wherein the composition is halogen-free.

9. The polymer composition according to claim 6, comprising a styrene polymer.

10. The polymer composition according to claim 6, wherein the polymer is a foam.

11. The polymer composition according to claim 10, wherein the density of the polymer foam is from 5 to 150 g/l.

12. The polymer composition according to claim 9, in the form of an expandable styrene polymer (EPS).

13. The polymer composition according to claim 9, in the form of an extruded styrene polymer foam (XPS).

14. An insulation material comprising the polymer composition according to claim 13.

15. An insulation material comprising the polymer composition according to claim 12 in expanded form.

16. The flame retardant according to claim 1, wherein the at least one phosphorus compound is a compound of the formula (III)

(III)

$$R^{14}\underset{R^{15}}{\overset{(X^4)_b}{\underset{|}{\overset{\|}{P}}}}\!\!-\!\!O\!\!-\!\!B\!\!-\!\!O\!\!\underset{a}{\!\!\!\!\!\!}R^{16},$$

wherein
B is a

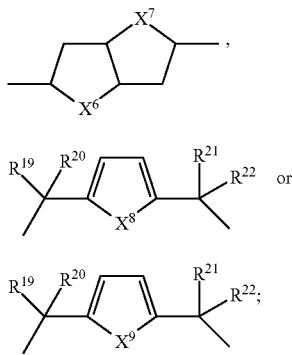
(IV)

(V)

(VI)

group;

$R^{16}$ is $-P(=X^5)_c R^{17} R^{18}$, H, a straight-chain or branched $C_1$-$C_{12}$-alkyl group, $C_5$-$C_6$-cycloalkyl, $C_6$-$C_{12}$-aryl, or benzyl, where the four last-mentioned groups are unsubstituted or have substitution by one or more radicals from the group of $C_1$-$C_4$-alkyl and $C_2$-$C_4$-alkenyl;

$R^{14}$, $R^{15}$, $R^{17}$, and $R^{18}$ are identical or different, being hydrogen, OH, $C_1$-$C_{16}$-alkyl, $C_2$-$C_{16}$-alkenyl, $C_1$-$C_{16}$-alkoxy, $C_2$-$C_{16}$-alkenoxy, $C_3$-$C_{10}$-cycloalkyl, $C_3$-$C_{10}$-cycloalkoxy, $C_6$-$C_{10}$-aryl, $C_6$-$C_{10}$-aryloxy, $C_6$-$C_{10}$-aryl-$C_1$-$C_{16}$-alkyl, $C_6$-$C_{10}$-aryl-$C_1$-$C_{16}$-alkoxy, $SR^{23}$, $COR^{24}$, $COOR^{25}$, $CONR^{26}R^{27}$, or two radicals $R^{14}$, $R^{15}$, $R^{17}$, or $R^{18}$ form, together with the phosphorus atom bonded thereto, or with a P—O—B—O—P group, a ring system;

$R^{19}$, $R^{20}$, $R^{21}$, and $R^{22}$ are identical or different, being H, $C_1$-$C_{16}$-alkyl, $C_2$-$C_{16}$-alkenyl, $C_1$-$C_{16}$-alkoxy or $C_2$-$C_{16}$-alkenoxy;

$R^{23}$, $R^{24}$, $R^{25}$, $R^{26}$, and $R^{27}$ are identical or different, being H, $C_1$-$C_{16}$-alkyl, $C_2$-$C_{16}$-alkenyl, $C_6$-$C_{10}$-aryl, $C_6$-$C_{10}$-aryl-$C_1$-$C_{16}$-alkyl or $C_6$-$C_{10}$-aryl-$C_1$-$C_{16}$-alkoxy;

$X^4$ and $X^5$ are identical or different, being S or O;

b and c are identical or different, being 0 or 1;

$X^6$, $X^7$, $X^8$, and $X^9$ are identical or different, being S or O, and a is a natural number from 1 to 50.

* * * * *